United States Patent
Hanis et al.

(10) Patent No.: US 9,754,630 B2
(45) Date of Patent: *Sep. 5, 2017

(54) SYSTEM TO DISTINGUISH BETWEEN VISUALLY IDENTICAL OBJECTS

(71) Applicant: International Business Machines Corporation, Armonk, NY (US)

(72) Inventors: Thomas T. Hanis, Raleigh, NC (US); Bruce H. Hyre, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/075,253

(22) Filed: Mar. 21, 2016

(65) Prior Publication Data

US 2016/0293217 A1    Oct. 6, 2016

Related U.S. Application Data

(63) Continuation of application No. 14/672,463, filed on Mar. 30, 2015.

(51) Int. Cl.
| | |
|---|---|
| *G11B 27/19* | (2006.01) |
| *G06K 7/10* | (2006.01) |
| *H04N 5/91* | (2006.01) |
| *H04N 9/82* | (2006.01) |
| *G11B 27/28* | (2006.01) |

(52) U.S. Cl.
CPC .......... *G11B 27/19* (2013.01); *G06K 7/10297* (2013.01); *G11B 27/28* (2013.01); *H04N 5/91* (2013.01); *H04N 9/8205* (2013.01)

(58) Field of Classification Search
None
See application file for complete search history.

(56) References Cited

U.S. PATENT DOCUMENTS

| | | |
|---|---|---|
| 6,791,603 B2 | 9/2004 | Lazo et al. |
| 6,998,987 B2 | 2/2006 | Lin |
| 7,049,965 B2 | 5/2006 | Kelliher et al. |

(Continued)

FOREIGN PATENT DOCUMENTS

| | | |
|---|---|---|
| CN | 102999956 A | 3/2013 |
| WO | 2007030168 A1 | 3/2007 |
| WO | 2014026065 A1 | 2/2014 |

OTHER PUBLICATIONS

IBM, "List of IBM Patents or Patent Applications Treated as Related (Appendix P)," Mar. 21, 2016, p. 1-2.

(Continued)

*Primary Examiner* — Eileen Adams
(74) *Attorney, Agent, or Firm* — Patricia B. Feighan

(57) ABSTRACT

A method to include an identifier as metadata associated with a captured image is provided. The method may include receiving, by a device, an image and a unique identifier associated with the image, wherein the received image is a frame associated with a video stream. The method may also include storing the unique identifier as metadata associated with the received image, whereby the metadata is linked to a specific frame in the video stream according to a plurality of parameters, and whereby the unique identifier is received from a unique ID reader which reads a tag attached to an object included in the image.

8 Claims, 5 Drawing Sheets

(56) References Cited

U.S. PATENT DOCUMENTS

| | | | |
|---|---|---|---|
| 8,334,775 B2 | 12/2012 | Tapp et al. | |
| 8,830,331 B2 | 9/2014 | Haritaoglu | |
| 8,861,865 B2 | 10/2014 | Jeong et al. | |
| 2013/0140367 A1* | 6/2013 | Binmore | G06K 19/07779 235/492 |
| 2014/0044405 A1 | 2/2014 | McGrath et al. | |
| 2014/0347475 A1* | 11/2014 | Divakaran | G06K 9/00771 348/135 |
| 2015/0164606 A1* | 6/2015 | Jacobs | A61B 19/5244 606/1 |
| 2016/0114104 A1* | 4/2016 | Hyde | A61M 5/16804 604/890.1 |
| 2016/0335484 A1* | 11/2016 | Xie | G06K 9/00335 |

OTHER PUBLICATIONS

Hanis et al., "System to Distinguish Between Visually Identical Objects," Application and Drawings, Filed Mar. 30, 2015, 27 Pages, U.S. Appl. No. 14/672,463.

Nam et al., "Intelligent video surveillance system: 3-tier context-aware surveillance system with metadata," Multimedia Tools and Applications, 2012, p. 315-334, vol. 57, Issue 2, Published Online: Dec. 22, 2010, Springer Science + Business Media, LLC.

* cited by examiner

SYSTEM TO DISTINGUISH BETWEEN VISUALLY IDENTICAL OBJECTS

BACKGROUND

The present invention relates generally to the field of computers, and more particularly to video analytics.

Video content analytics (VA) is the capability of automatically analyzing video to detect and determine temporal and spatial events. Such video analytics provide automated security screening to businesses, governments, schools, or any location where people, vehicles, or other movable objects exist. They include powerful image analysis algorithms to isolate and identify one object from another, as well as tracking an object's trajectory.

SUMMARY

According to one embodiment, a method to include an identifier as metadata associated with a captured image is provided. The method may include receiving, by a device, an image and a unique identifier associated with the image, wherein the received image is a frame associated with a video stream. The method may also include storing the unique identifier as metadata associated with the received image, whereby the metadata is linked to a specific frame in the video stream according to a plurality of parameters, and whereby the unique identifier is received from a unique ID reader which reads a tag attached to an object included in the image.

According to another embodiment, a computer system to include an identifier as metadata associated with a captured image is provided. The computer system may include one or more processors, one or more computer-readable memories, one or more computer-readable tangible storage devices, and program instructions stored on at least one of the one or more storage devices for execution by at least one of the one or more processors via at least one of the one or more memories, whereby the computer system is capable of performing the method described above.

According to yet another embodiment, a computer program product to include an identifier as metadata associated with a captured image is provided. The computer program product may include one or more computer-readable storage devices and program instructions stored on at least one of the one or me tangible storage devices, the program instructions executable by a processor. The computer program product may include program instructions to receive, by a device, at least one image and at least one unique identifier associated with at least one image. The computer program product may also include program instructions to perform the method previously described.

BRIEF DESCRIPTION OF THE SEVERAL VIEWS OF THE DRAWINGS

These and other objects, features and advantages of the present invention will become apparent from the following detailed description of illustrative embodiments thereof, which is to be read in connection with the accompanying drawings. The various features of the drawings are not to scale as the illustrations are for clarity in facilitating one skilled in the art in understanding the invention in conjunction with the detailed description. In the drawings.

DETAILED DESCRIPTION

Figure 1:
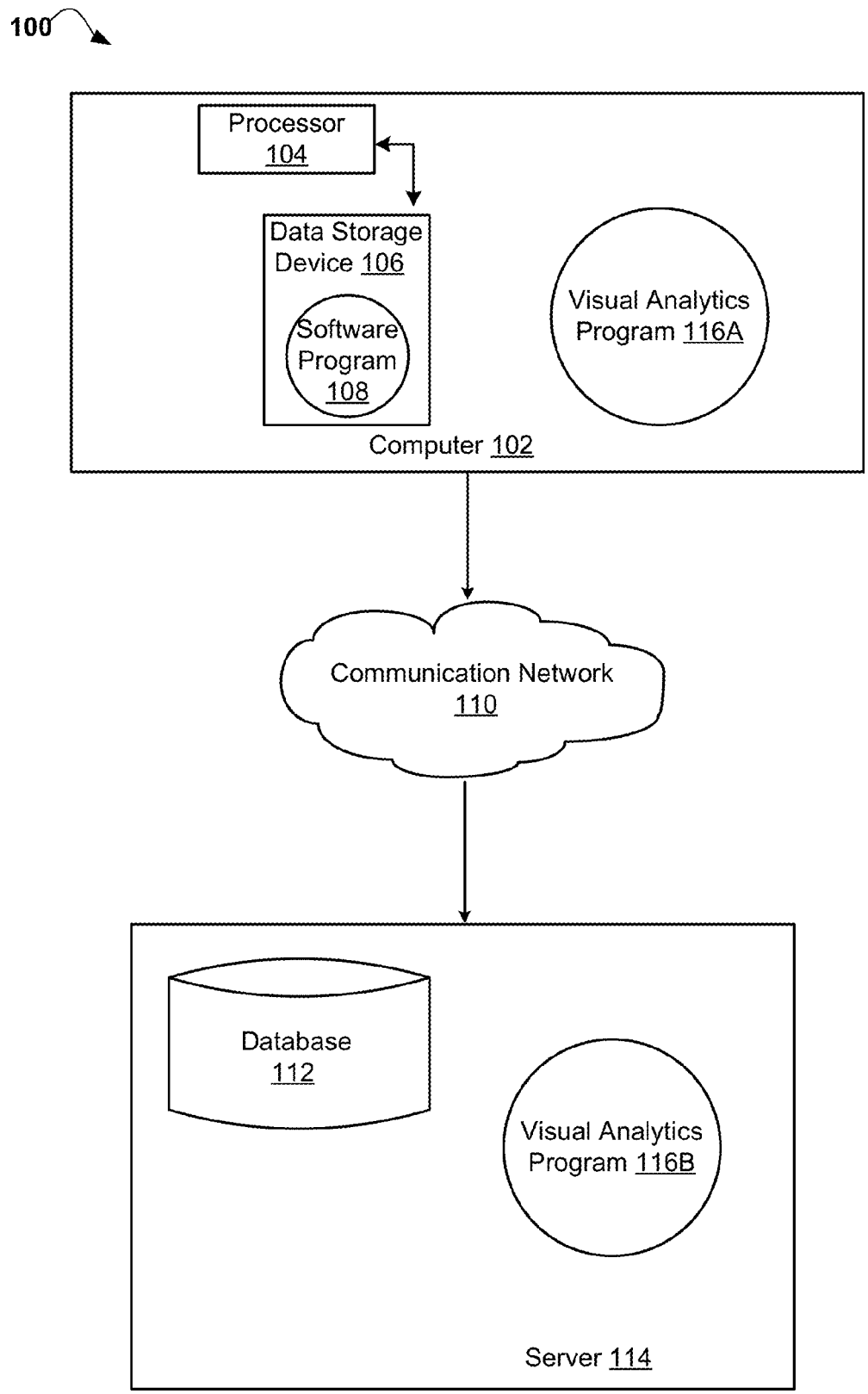
FIG. 1 illustrates a networked computer environment according to at least one embodiment.

Detailed embodiments of the claimed structures and methods are disclosed herein; however, it can be understood that the disclosed embodiments are merely illustrative of the claimed structures and methods that may be embodied in various forms. This invention may, however, be embodied in many different forms and should not be construed as limited to the exemplary embodiments set forth herein. Rather, these exemplary embodiments are provided so that this disclosure will be thorough and complete and will fully convey the scope of this invention to those skilled in the art. In the description, details of well-known features and techniques may be omitted to avoid unnecessarily obscuring the presented embodiments.

Embodiments of the present invention relate generally to the field of computers, and more particularly to video analytics. The following described exemplary embodiments provide a system, method and program product to, among other things, enable a visual analytics system to distinguish between visually identical objects. Therefore, the present embodiment has the capacity to improve the technical field of visual analytics by linking unique tagging (i.e., a unique identifier) with a captured image associated with a video stream (i.e., a captured frame or series of still frames associated with a moving image, such as a video stream). More specifically, the present embodiment may enable the tagged items to be uniquely identified by the video camera and allow the camera to capture that information as part of the video metadata.

As previously described, video analytics can assist with security screening. Various implementations of the present embodiment may include image analysis algorithms to isolate and identify one object from another, as well as tracking the object's trajectory. As such, video analytics may be used to create useful intelligence from video steams through the recognition of people and things through matching of visual properties and characteristics. Once individuals or specific items are identified then intelligent inferences can be drawn based on other visual information provided in the video stream along with metadata information, such as time of day, location, movement (i.e., movement of the tag), boundary crossing (i.e., a threshold specific to an area being monitored, such as entering a building, leaving a room, passing through security, etc.), etc. For example, video analytics are focused on visual information, such as color of hair, torso, legs, skin, etc. and facial recognition is currently possible, however, only with an ideal, or close-to-ideal image, such as straight-on, well-lit, and high resolution. As such, margins of error are 70-80% for color matching, but lower for facial recognition unless a perfect image is captured. Therefore, actually associating a reliable identity to something in the visual field is a significant improvement in information. Based on such an implementation, multiple pieces of information can be tied together, as long as there is an identity link. For example, Person X swipes their badge at a door, then later Person X is captured by one of the tagged items, the last time that tagged item is ever seen. As such, Person X can be placed at the scene of the crime, with additional backing content. On the other hand, if Person X was observed elsewhere at the same time, then they could be exonerated.

However, one difficulty of video analytics is that the item or person in the video may not be distinguishable, and therefore not uniquely trackable. This can happen because of video quality or relative position of the person or item to the camera, or that the person or item are not visually distinguishable from other similar subjects. This is more common in things rather than people.

Currently, there is no image-processing algorithm capable of distinguishing 2 visually identical objects, such as 2 standard shipping containers, 2 laptops, 2 people with sunglasses or masks, etc. This is particularly important where there may be several of the items, yet only a subset are of interest to the observer. Therefore it is difficult to distinguish the "important" ones from the "unimportant" (e.g., company-owned laptops vs. guest-owned laptops). As such, it may be advantageous, among other things, to enhance the analytics processing of video streams by uniquely identifying items in the video.

According to at least one implementation, the present embodiment may enhance the analytics processing of video streams by uniquely identifying items in the video by a unique ID. Therefore, the ID can be captured with the video metadata and used to process single and multiple video streams with assurance that items in the video are positively and uniquely identified. As such, the present embodiment provides a mechanism by which a video analytics system could distinguish between such visually identical items by injecting external identification for the purpose of supporting video reconciliation and tracking in a variety of scenarios such as:

Item theft—verified item removal through a monitored door or other threshold.

Item tracking—tracking movement of the tags between multiple geographically distributed video cameras (i.e., boundary crossing).

Hidden item tracking—tracking hidden items by association with visually unique object.

Participant/Situational analysis—analysis of participants and environment where the uniquely identified item can be tracked as an identifying linkage.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The following described exemplary embodiments provide a system, method and program product to enable a visual analytics system to distinguish between visually identical objects. According to at least one implementation, the present embodiment links unique tagging with a video stream such that tagged items can be uniquely identified by the video camera and allow the camera to capture that information as part of the video metadata. With the combination of unique identifiers captured along with the current video image snapshot (i.e., a captured frame or series of still frames associated with a moving image, such as a video stream), the present embodiment can enable significant improvement in asset-based analytics. More specifically, the present embodiment may provide reliable, unique, trackable identity to previously indistinguishable objects in the video stream using association, and therefore, enabling new forms of video analysis. Additionally, the present embodiment accomplishes the association by providing direct encoding into the video metadata stream and persisting separately, in a data store or file, links to a video stream by frame referenced though identifiers such as time stamps, timecode, frame number, offset (i.e., a mechanism to identify a specific location in the video stream, such as identifying a specific portion of the video by time (assuming the video has time reference imbedded) or frame reference, or an offset from a well-defined point ("3 minutes and 10 seconds into the video playback from the beginning", for example)), etc. According to the present embodiment, the metadata would come in a discrete read, at a specific time. If stored in the data stream, the metadata would be attached at the point when the metadata is received (at the nearest keyframe).

Referring to FIG. 1, an exemplary networked computer environment 100 in accordance with one embodiment is depicted. The networked computer environment 100 may include a computer 102 with a processor 104 and a data storage device 106 that is enabled to run a software program 108 and a Visual Analytics Program 116A. The networked computer environment 100 may also include a server 114 that is enabled to run a Visual Analytics Program 116B that may interact with a database 112 and a communication network 110. The networked computer environment 100 may include a plurality of computer 102 and servers 114, only one of which is shown. The communication network may include various types of communication networks, such as a wide area network (WAN), local area network (LAN), a telecommunication network, a wireless network, a public switched network and/or a satellite network. It should be appreciated that FIG. 1 provides only an illustration of one implementation and does not imply any limitations with regard to the environments in which different embodiments may be implemented. Many modifications to the depicted environments may be made based on design and implementation requirements.

The client computer 102 may communicate with the Visual Analytics Program 116B running on server computer 114 via the communications network 110. The communications network 110 may include connections, such as wire, wireless communication links, or fiber optic cables. As will be discussed with reference to FIG. 5, server computer 114 may include internal components 800a and external components 900a, respectively, and client computer 102 may include internal components 800b and external components 900b, respectively. Client computer 102 may be, for example, a mobile device, a telephone, a personal digital assistant, a netbook, a laptop computer, a tablet computer, a desktop computer, or any type of computing devices capable of running a program, accessing a network, and accessing a database 112. According to various implementations of the present embodiment, the Visual Analytics Program 116A, 116B may interact with a database 112 that may be embedded in various storage devices, such as, but not limited to a computer/mobile device 102, a networked server 114, or a cloud storage service.

As previously described, the client computer 102 can access the Visual Analytics Program 116B, running on server computer 114 via the communications network 110. For example, a user using a client computer 102 may use the Visual Analytics Program 116A, 116B to enable a visual analytics system to distinguish between visually identical objects. As such, the present embodiment, provides the linking of unique tagging with a video stream. More specifically, the present embodiment enables the tagged items to be uniquely identified by the video camera and allows the camera to capture that information as part of the video metadata. The Visual Analytics method is explained in more detail below with respect to FIGS. 2-4.

Figure 2:
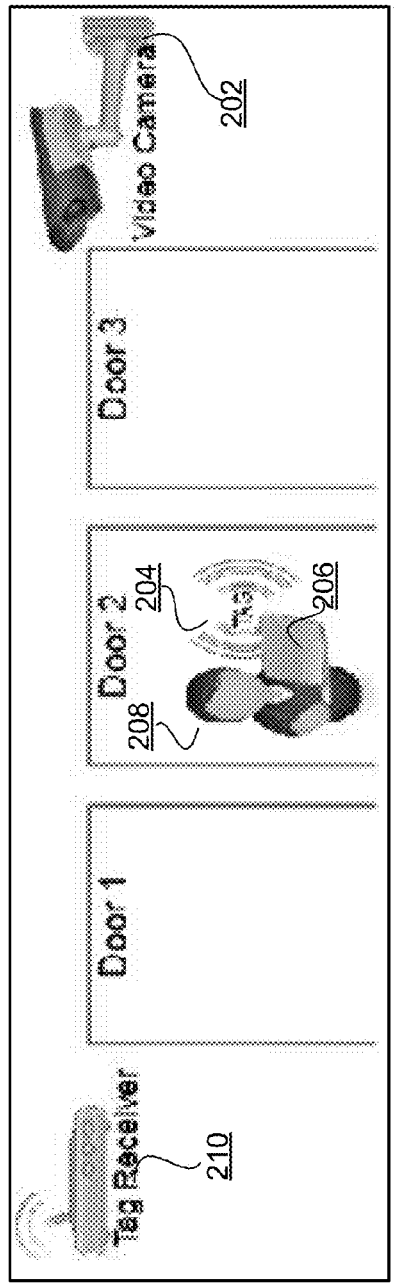
FIG. 2 is an exemplary illustration of the tracking of a single item according to at least one embodiment.

Referring now to FIG. 2, an exemplary illustration 200 of the tracking of a single item in accordance with one embodiment is depicted. As such, at least embodiment applies when there is one or more valuable objects of interest, located in an area to be monitored, co-mingled with items that are not of interest. As such a computer 102 (FIG. 1) running the Visual Analytics Program 116A (FIG. 1) (i.e., a Video Analytics System) with a camera 202 may be monitoring this area of interest. According to at least one implementation, unique identifier tags 204 (RFID, radio, acoustic, visual, or otherwise) can be attached to the object(s) 206 of interest. Additionally, the receivers for the tags 210 may be located within receiving range of the tagged items 206 (as may be required by the identifier technology), such that they can detect movement of the tags 204, or at least presence of the tags 204 (i.e. not present=removed from the area). According to the present embodiment, if an item, such as a laptop 206, is tagged using RFID, for example, the tag's 204 unique serial number is typically associated with the laptop's serial number in an inventory system. There can be additional data in those inventory systems, and/or carried on the tag itself 204 (some tags 204 can have up to 1K of user-defined data in addition to the unique identifier). In terms of what is tagged, the present embodiment determines this by item value (e.g. a laptop 206), or sensitivity (classified documents), or safety (pharma). As such, for a laptop 206, such information might include the make, model, serial, RAM, CPU, drive space, screen size, and radio options. For Pharma, it may be the batch/lot, manufacture date, and source factory. To determine which tag 204 was associated with which object 206, it depends on the tagging technology. For RFID, a chokepoint reader would be needed, and the tag density couldn't be so high that there wasn't enough separation to get separate tag reads in the chokepoint. For acoustic tags, a grid of receivers (microphones) is used if triangulation is desired.

According to at least one implementation of the present embodiment, a single item 206 will be tracked when a person 208 removes the item 206 of interest from the area by enabling the tag identity 204 to be read by the tag reader 210 and injecting a unique identifier associated with the tag 204 into the video metadata. Therefore, this metadata is available for immediate processing and/or stored in a repository such as a database 112 (FIG. 1) for later forensic search. Then, if later, it is realized that the item 206 was taken by an unauthorized person 208, the video system can be searched for the item's unique identifier, retrieving the video frames of the perpetrator 208 exiting the area with the item. Therefore, according to the present embodiment, once the tag 204 is read and associated with the video stream, the tag 204 is effectively associated with the perpetrator 208, as he/she 208 will be in the video frame associated with that tag 204. According to at least one implementation, the tags are affixed to the physical item 206 at purchase or receipt time. Currently, some items 206 are being manufactured with the tags already embedded into the product.

Figure 3:
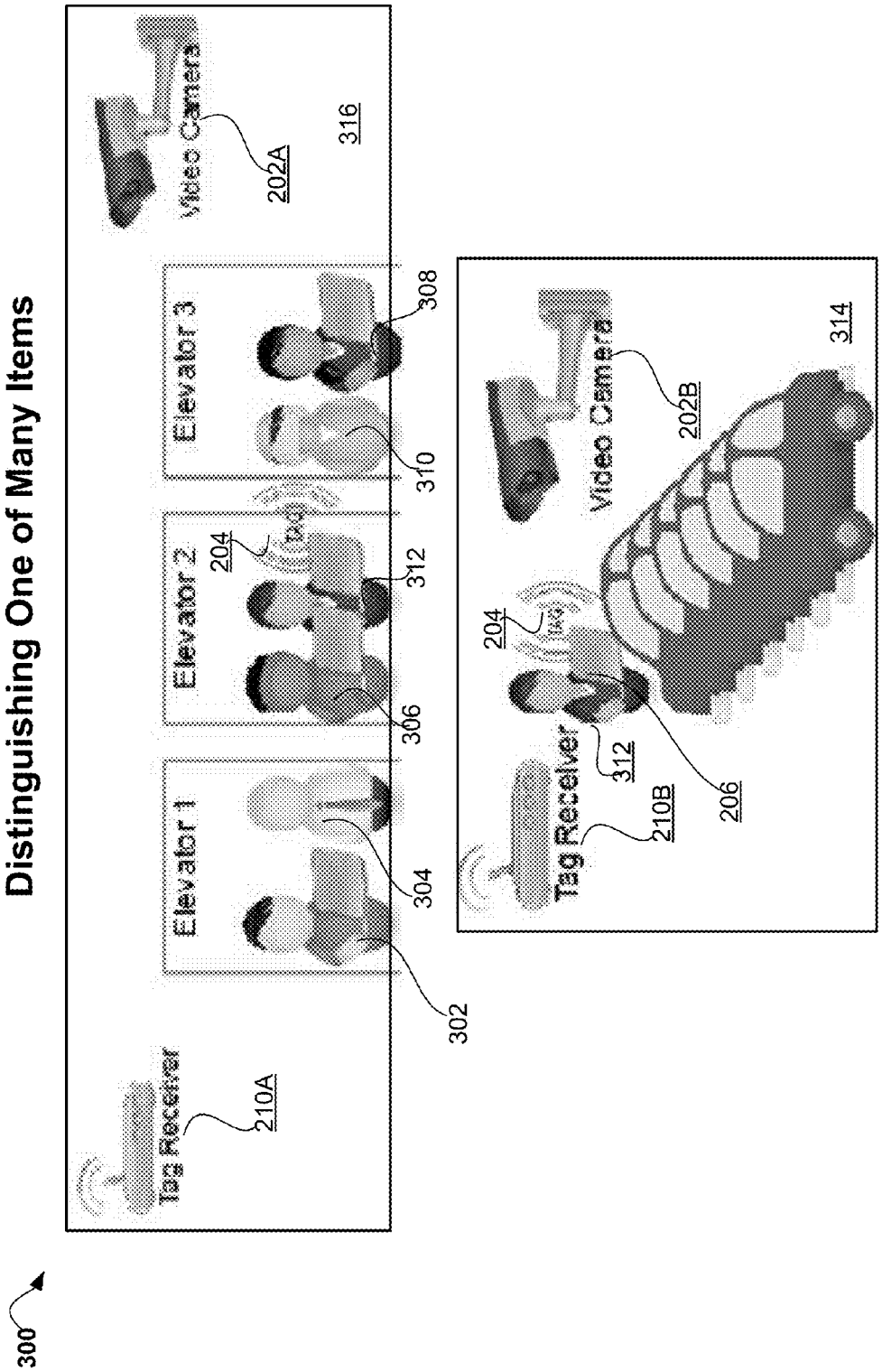
FIG. 3 is an exemplary illustration distinguishing one of many items according to at least one embodiment.

Referring now to FIG. 3, an exemplary illustration 300 distinguishing one of many items in accordance with one embodiment is depicted. According to at least one implementation, when a person 312 removes an item of interest 206 from the area, with many people 302-310 surrounding them, the tag identity 204 may be read by the tag reader 210A, 210B, and the unique identifier may be associated with the video metadata. As such, this metadata can then be available for immediate processing and/or stored in a repository such as a database 112 (FIG. 1) for later forensic search.

According to at least one implementation, if this person 312 goes to the parking garage 314, then the tag 204 may be read again by a tag receiver 210B, and associated with video from the garage camera 202B. Therefore, if later, it is realized that the item was taken by an unauthorized person 312, the video system can be searched for the item's unique identifier, retrieving the video frames from all areas 314, 316 and cameras 202A, 202B that detected the tag 204. As such, now knowing the individual 312 involved, the video system can be searched for the same individual 312. With multiple angles available, the best facial image can be selected for law enforcement (or automated facial recognition), or car model and license plate captured, etc.

Figure 4:
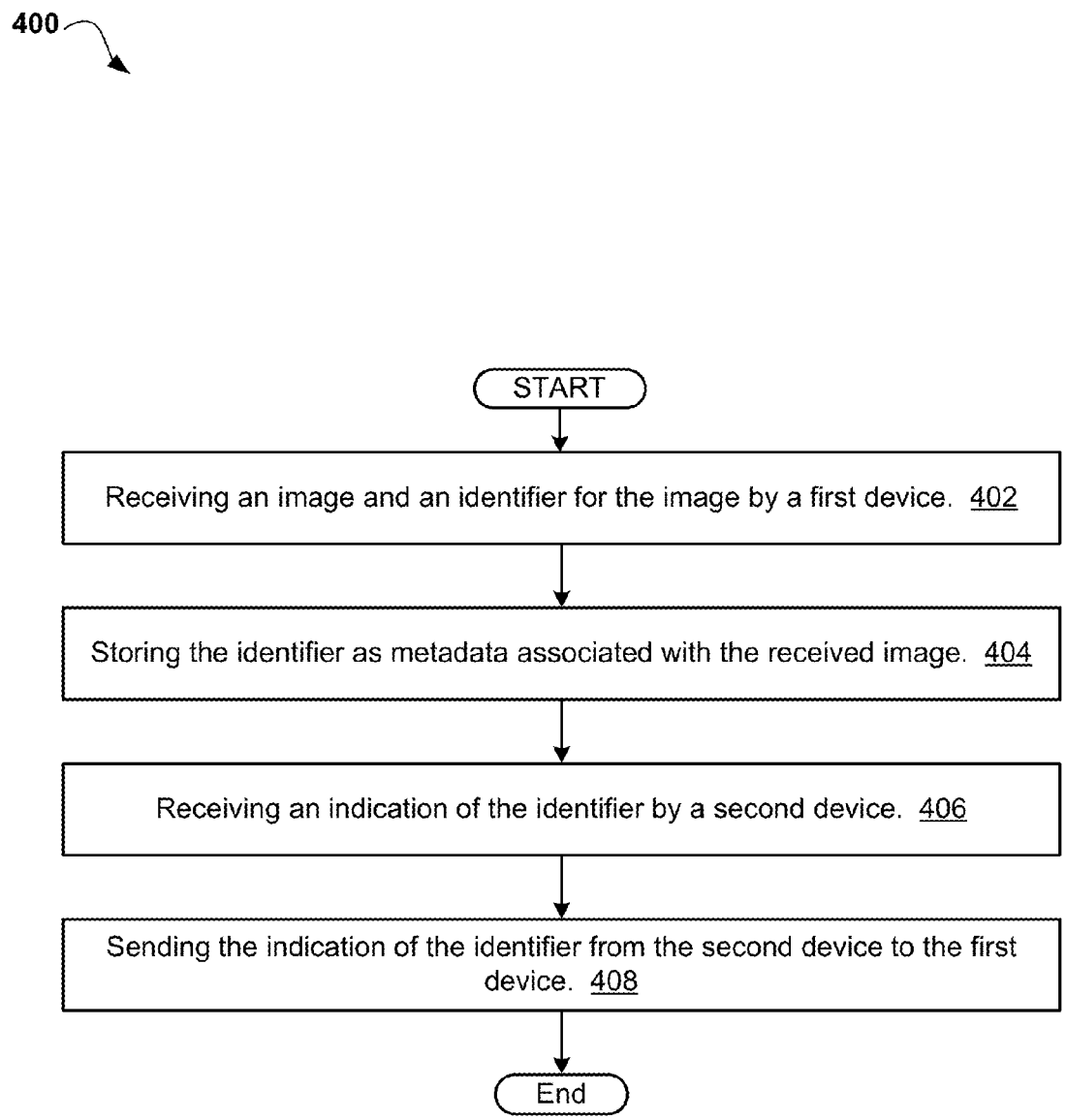
FIG. 4 is an operational flowchart illustrating the steps carried out by a program to distinguish visually identical objects according to at least one embodiment.

Referring now to FIG. 4, an operational flowchart 400 illustrating the steps carried out by a program to distinguish visually identical objects in accordance with one embodiment is depicted.

Therefore with respect to FIG. 4 at 402, a device receives an image (i.e., a point in a video stream) and a unique identifier for the image. As previously described, a computer 102 (FIG. 1) running the Visual Analytics Program 116A (FIG. 1) (i.e., a Video Analytics System) with cameras 202 (FIG. 2) may be monitoring an area of interest. According to at least one implementation, unique identifier tags 204 (FIG. 2) (RFID, radio, ultrasonic acoustic, visual (e.g. QR), or otherwise) can be attached to an object or objects of interest. Additionally, the receivers for the tags 210 (FIG. 2) can be located within receiving range of the tagged items such that they can detect movement of the identifier tags 204 (FIG. 2), or at least presence of the identifier tags 204 (FIG. 2).

Then at 404, the Visual Analytics Program 116A, 116B (FIG. 1) stores the received unique identifier as metadata associated with the received image (i.e., a captured frame or series of still frames with respect to a moving image). For example, according to one embodiment the metadata is stored in a repository such as a database 112 (FIG. 1) for later forensic search. As such, reliable, unique, trackable identity is given to previously indistinguishable objects in the video stream using association, enabling new forms of video analysis. More specifically, the present embodiment accomplishes the association by providing direct encoding into the video metadata stream and persisting separately, in a data store or file, links to a video stream by frame referenced though identifiers such as time stamps, timecode, frame number, offset, etc.

For example, according to one implementation, the present embodiment uses a separate store (i.e., repository), with an association linking the sensor of the tag identifier (i.e., the unique id) 204 (FIG. 2) to a particular camera 202 (FIG. 2) (i.e. SensorA ←-belongsTo-→ CameraB), and each piece of metadata to a specific timestamp (video timecode) (i.e. RFID-TagId1 was seen in Camera2's view area at 1:23:45 UTC). With respect to the identifier implementation, the additional metadata can come from any number of technologies, including, but not limited to—Passive RFID; Active RFID; or Acoustic tags (a.k.a. ultrasonic tags). According to at least one implementation, the tag is received by a separate RFID reader. The reader could be housed in the same box as the camera, but is a separate sensor. The RFID reader could also be in a separate unit.

According to various implementations of the present embodiment, the hardware can physically be arranged a few different ways as follows: the unique ID reader (RFID etc.) may be part of the camera; the unique ID reader (RFID etc.) may be separate, and send the ID to the camera; the unique ID reader (RFID etc.) may be separate, and send the ID to a backend video system, which may make the association to the camera's video stream.

For example, the Visual Analytics Program 116A, 116B (FIG. 1) can receive an indication of the presence of the unique identifier by a second device at 406. As such, the unique identifier tag can be read again by a second device, such as another receiver. Then at 408, the second device sends the indication of the identifier to the device. As such, an item can be tracked when a person removes an item of interest from the area by enabling the tag identity 204 (FIG. 2) to be read by the tag reader 210 (FIG. 2) and injecting the unique identifier into the video metadata. Then, if later, it is realized that the item was taken by an unauthorized person, the video system can be searched for the item's unique identifier, retrieving the video frames of the perpetrator exiting the area with the item.

It may be appreciated that FIG. 4 provides only an illustration of one implementation and does not imply any limitations with regard to how different embodiments may be implemented. Many modifications to the depicted environments may be made based on design and implementation requirements. For example, as previously described, the Visual Analytics Program 116A, 116B (FIG. 1) can capture an electronic signature (i.e., a unique identifier) of an object in the video image (i.e., a moving image) and therefore, can have many potential additional usage scenarios and applications that are enabled. For example, according to one implementation, the present embodiment can verify that something in a video capture is able to be uniquely identified independent of visual distinctions, such as video capture at an exit door that is watching for equipment removal (e.g., laptops that all look the same). If it is determined that one of the identical items went missing, the present embodiment can identify the missing item electronically and the video can show the item leaving and the circumstance under which the item left (i.e., who was carrying it, was it concealed, etc.). Therefore, an item can be tracked between locations with video capture. Even though multiple items may appear to be undistinguishable, the present embodiment creates a signature (i.e., a unique identifier) that can assist in piecing together movement of the missing item. Therefore, with associated context information in the video, the present embodiment pieces together common threads or determines a transit path. As such the present embodiment can identify an item, monitor the item, and track it.

Furthermore, the electronic signature (i.e., unique identifier) of the item that the present embodiment creates may become similar to a license plate since the electronic signature is associated with a specific item. For example, while the signature is the unique id, the context associated with the signature is relative and may include information such as who is in the picture; who is in all the pictures where that license (i.e., electronic signature) is noticed; or what else is in the pictures. As such, the present embodiment focuses on the captured context surrounding the item in question and the entire context thread that has been electronically recorded. Furthermore, the present embodiment associates unique identifier information to the video stream (i.e., associates the unique identifier information with the video data), which enables tracking visually identical objects, as well as other uses, such as tracking objects better (whether visually similar, occluded/hidden, poor lighting, etc.) by associating additional unique identifier information. Possible implementation of the physical hardware may include, but is not limited to a camera with an additional receiver, which injects the metadata structures directly into the video stream itself, using MPEG-7, EXIF, or other similar encoding. Additionally, there can be physically separate sensors, which may or may not be directly co-located with the camera. For example, as previously described, the present embodiment may use a separate store (i.e., repository), with an association linking the sensor to a particular camera (i.e. SensorA ←-belongsTo-→ CameraB), and each piece of metadata to a specific timestamp (video timecode) (i.e. RFID-TagId1 was seen in Camera2's view area at 1:23:45 UTC). With respect to the identifier implementation, the additional metadata can come from any number of technologies, including, but not limited to—Passive RFID; Active RFID; or Acoustic tags (a.k.a. ultrasonic tags). According to the present embodiment, the tag is created (and the unique identifier embedded into it), at the time of the manufacturing of the tag. This tag is then affixed to the item of interest (i.e., a computer). (Note: in some cases, the unique ID is written to the RFID tag when it is affixed to the physical object). As such, along the item's path (i.e. if it is stolen, and moved from room to room), the item and tag remain constant. The context surrounding the item changes, and will provide information as to the history and location of the object (i.e. which camera, RFID reader, and location also captured that tag on a missing computer—as well as the person carrying the computer).

Figure 5:
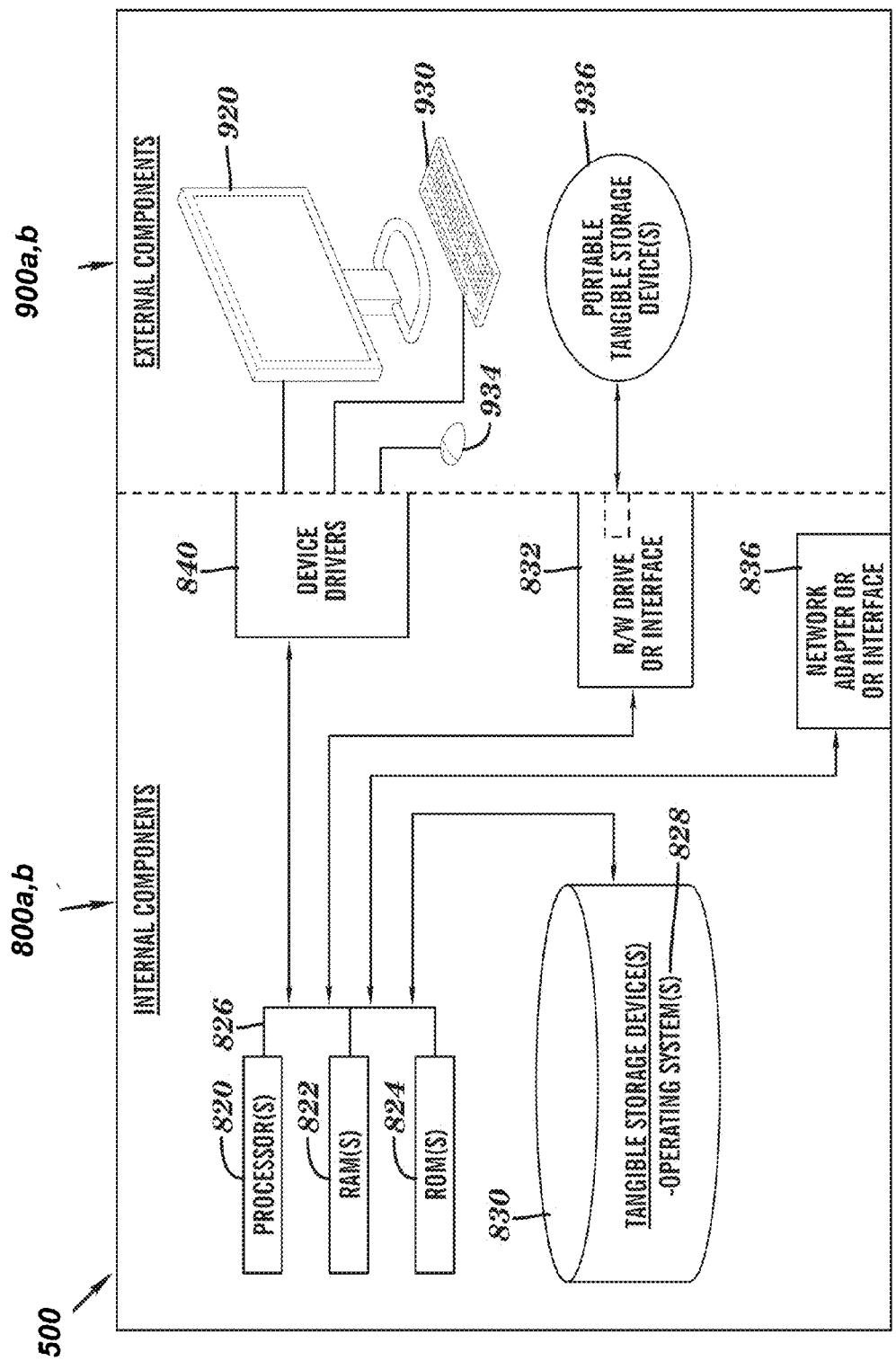
FIG. 5 is a block diagram of internal and external components of computers and servers depicted in FIG. 1 according to at least one embodiment.

FIG. 5 is a block diagram 500 of internal and external components of computers depicted in FIG. 1 in accordance with an illustrative embodiment of the present invention. It should be appreciated that FIG. 5 provides only an illustration of one implementation and does not imply any limitations with regard to the environments in which different embodiments may be implemented. Many modifications to the depicted environments may be made based on design and implementation requirements.

Data processing system 800, 900 is representative of any electronic device capable of executing machine-readable program instructions. Data processing system 800, 900 may be representative of a smart phone, a computer system, PDA, or other electronic devices. Examples of computing systems, environments, and/or configurations that may be represented by data processing system 800, 900 include, but are not limited to, personal computer systems, server computer systems, thin clients, thick clients, hand-held or laptop devices, multiprocessor systems, microprocessor-based systems, network PCs, minicomputer systems, and distributed cloud computing environments that include any of the above systems or devices.

User client computer 102 (FIG. 1) and network server 114 (FIG. 1) may include respective sets of internal components 800 a,b and external components 900 a,b illustrated in FIG. 5. Each of the sets of internal components 800 include one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and the Software Program 108 (FIG. 1) and the Visual Analytics Program 116A (FIG. 1) in client computer 102 (FIG. 1) and the Visual Analytics Program 116B (FIG. 1) in network server 114 (FIG. 1) are stored on one or more of the respective computer-readable tangible storage devices 830 for execution by one or more of the respective processors 820 via one or more of the respective RAMs 822 (which typically include cache memory). In the embodiment illustrated in FIG. 5, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800 a,b also includes a R/W drive or interface 832 to read from and write to one or more portable computer-readable tangible storage devices 936 such as a CD-ROM, DVD, memory stick, magnetic tape, magnetic disk, optical disk or semiconductor storage device. A software program, such as the Software Program 108 (FIG. 1) and the Visual Analytics Program 116A, 116B (FIG. 1) can be stored on one or more of the respective portable computer-readable tangible storage devices 936, read via the respective R/W drive or interface 832 and loaded into the respective hard drive 830.

Each set of internal components 800 a,b also includes network adapters or interfaces 836 such as a TCP/IP adapter cards, wireless Wi-Fi interface cards, or 3G or 4G wireless interface cards or other wired or wireless communication links. The Software Program 108 (FIG. 1) and the Visual Analytics Program 116A (FIG. 1) in client computer 102 (FIG. 1) and the Visual Analytics Program 116B (FIG. 1) in network server 114 (FIG. 1) can be downloaded to client computer 102 (FIG. 1) and network server 114 (FIG. 1) from an external computer via a network (for example, the Internet, a local area network or other, wide area network) and respective network adapters or interfaces 836. From the network adapters or interfaces 836, the Software Program 108 (FIG. 1) and the Visual Analytics Program 116A (FIG. 1) in client computer 102 (FIG. 1) and the Visual Analytics Program 116B (FIG. 1) in network server 114 (FIG. 1) are loaded into the respective hard drive 830. The network may comprise copper wires, optical fibers, wireless transmission, routers, firewalls, switches, gateway computers and/or edge servers.

Each of the sets of external components 900 a,b can include a computer display monitor 920, a keyboard 930, and a computer mouse 934. External components 900 a,b can also include touch screens, virtual keyboards, touch pads, pointing devices, and other human interface devices. Each of the sets of internal components 800 a,b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

The descriptions of the various embodiments of the present invention have been presented for purposes of illustration, but are not intended to be exhaustive or limited to the embodiments disclosed. Many modifications and variations will be apparent to those of ordinary skill in the art without departing from the scope of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method to include an identifier as metadata associated with a captured image, the method comprising:
    receiving an image and a unique identifier associated with the image, wherein the received image is a frame associated with a video stream;
    storing, in a repository, an association linking a sensor associated with the received unique identifier to a camera associated with a unique ID reader that read a tag attached to an object included in the image; and
    storing the unique identifier as metadata associated with the received image, wherein the metadata is linked to a specific frame in the video stream according to a plurality of parameters, and wherein the unique identifier is received from the unique ID reader which reads the tag attached to the object included in the image, and wherein the stored metadata includes the camera associated with the unique ID reader and a timestamp indicating a time when the unique ID reader read the tag attached to the object included in the image.

2. The method of claim 1, wherein the received image is captured by a video camera.

3. The method of claim 1, wherein the metadata comprises at least one of a time of day, a location, a movement, and a boundary crossing.

4. The method of claim 2, wherein a unique ID reader is either integrated as part of the video camera or separate from the video camera.

5. The method of claim 1, wherein the unique ID reader can send the unique identifier to the video camera or to a backend video system, wherein the backend video system can make an association to the video stream associated with a video camera.

6. The method of claim 1, wherein the metadata is derived from a tag selected from a group consisting of a Passive RFID and Active RFID, an ultrasonic tag, and an Acoustic tag.

7. The method of claim 1, wherein the plurality of parameters include at least one of a specific timestamp, a timecode, a frame number, and an offset.

8. The method of claim 1, wherein the stored unique identifier is used to distinguish a plurality of visually identical objects.

* * * * *